United States Patent [19]

Wiltzer et al.

[11] Patent Number: 5,973,105

[45] Date of Patent: Oct. 26, 1999

[54] PROCESS FOR CONTINUOUSLY PREPARING A POLYAMIDE 6 WITH A LOW DIMER CONTENT

[75] Inventors: Karlheinz Wiltzer, Bad Blankenburg; Peter Lausmann, Rudolstadt; Baldur Ebert, Bad Blankenburg, all of Germany

[73] Assignee: Polymer Engineering GmbH, Germany

[21] Appl. No.: 09/029,522

[22] PCT Filed: Aug. 30, 1996

[86] PCT No.: PCT/EP96/03823

§ 371 Date: Feb. 27, 1998

§ 102(e) Date: Feb. 27, 1998

[87] PCT Pub. No.: WO97/08223

PCT Pub. Date: Mar. 6, 1997

[30] Foreign Application Priority Data

Aug. 30, 1995 [DE] Germany .......................... 195 31 989

[51] Int. Cl.$^6$ .............................. C08G 69/16; C08G 69/46
[52] U.S. Cl. .................... 528/323; 528/310; 528/322; 528/332; 528/335; 528/336; 528/342; 528/345; 528/349; 528/480; 528/499
[58] Field of Search ................... 528/328, 310, 528/322, 332, 335, 336, 342, 349, 480, 345, 499

[56] References Cited

U.S. PATENT DOCUMENTS

| | | | |
|---|---|---|---|
| 3,989,677 | 11/1976 | Brassat et al. | 528/323 |
| 4,002,430 | 1/1977 | Hoerauf et al. | 528/323 |
| 4,354,020 | 10/1982 | Rotzoll et al. | 528/323 |
| 4,539,391 | 9/1985 | Pipper et al. | 528/323 |
| 4,540,774 | 9/1985 | Gerking et al. | 528/323 |
| 4,891,420 | 1/1990 | Martin et al. | 528/323 |
| 4,978,743 | 12/1990 | Selbeck et al. | 528/323 |
| 5,030,709 | 7/1991 | Pipper et al. | 528/323 |
| 5,218,080 | 6/1993 | Dellinger | 528/323 |
| 5,674,973 | 10/1997 | Pipper et al. | 528/323 |
| 5,674,974 | 10/1997 | Brearley et al. | 528/323 |
| 5,703,204 | 12/1997 | Gittinger et al. | 528/323 |
| 5,773,555 | 6/1998 | Weger et al. | 528/323 |
| 5,824,763 | 10/1998 | Pagilagan | 528/323 |

FOREIGN PATENT DOCUMENTS

| | | |
|---|---|---|
| 0000397 | 1/1979 | European Pat. Off. . |
| 0005466 | 11/1979 | European Pat. Off. . |
| 0123881 | 11/1984 | European Pat. Off. . |
| 2501348 | 7/1976 | Germany . |
| 2948865 | 6/1980 | Germany . |
| 4324616 | 1/1995 | Germany . |

*Primary Examiner*—P. Hampton Hightower
*Attorney, Agent, or Firm*—Ostrolenk, Faber, Gerb & Soffen, LLP

[57] ABSTRACT

The invention concerns a process for continuously preparing polyamide 6 with a low dimer content from ε-caprolactam (fresh lactam) and/or from recycled lactams from extraction and melt-demonomerizing stages. In a plurality of process stages the recycled lactam and/or fresh lactam is hydrolyzed under pressure in the fusible state with water contents of between 3 and 15% and temperatures ranging from 220° C. to 280° C. With a lower constant water content being set, the molten polyamide is then fed to the polymerization process in a further pressure stage incorporating a gas chamber.

8 Claims, 2 Drawing Sheets

PROCESS FOR CONTINUOUSLY PREPARING A POLYAMIDE 6 WITH A LOW DIMER CONTENT

BACKGROUND OF THE INVENTION

The invention relates to a multistage process for continuously preparing a polyamide 6 with a low dimer content from $\epsilon$-caprolactam and/or from recycled lactams (so-called return lactams) which are obtained in extraction stages and melt demonomerization stages for reducing the low molecular mass fraction in the case of polyamide 6.

It is known that during the polycondensation of $\epsilon$-caprolactam to give polyamide 6 a chemical equilibrium is established which is temperature-dependent. At a common plant reaction temperature of 280° C., a water-soluble fraction of around 13% is established.

For the further processing of the polymer it is necessary to dissolve out the unreacted fraction. Various methods are known for this purpose. For example, the melt in the equilibrium state is used to prepare granules which are extracted with water. In that case $\epsilon$-caprolactam, oligomers and dimers are dissolved out. This method necessitates subsequent drying of the granules and processing of the aqueous extraction waters by evaporative concentration.

Also known are methods in which unreacted $\epsilon$-caprolactam, dimers and oligomers are driven off from melt films by means of reduced pressure or inert gas.

For economic reasons, these recovered products should be supplied to the polymerization process again.

There are methods in which PA 6 extract water concentrates with high or low solids contents are added in smaller or greater proportions to the fresh lactam in order that they too may be reacted to give polyamide 6. In accordance with DE-B 25 01 348 and DE-A 27 32 328 polyamide 6 extract waters concentrated to a solids content of more than 90% or, respectively, to 60–70% are polymerized with more than the equal amount of fresh lactam, based on the solids content, with propionic or, respectively, benzoic acid in a reactor which is operated essentially at atmospheric pressure.

A disadvantage of this process is that when polyamide 6 extract water concentrates are polymerized with monocarboxylic acids, the polymerization times required are longer than in the case of polymers of fresh lactam with monocarboxylic acids. In addition, the conversions of $\epsilon$-caprolactam or cyclic oligomers obtained are from about 2 to 3% below those of fresh lactam polymers, since the cyclic oligomers take essentially no part in the reaction mechanism. The high water content in the reaction mixture, in conjunction with the pressureless operation of the polymerization reactor, leads to an unfavorable reaction course. The water is unable to act in the reaction because it evaporates.

It is also known that melt vacuum demonomerization processes are operated such that the demonomerization products drawn off in gas form, i.e. $\epsilon$-caprolactam and cyclic oligomers, are condensed in fresh lactam and so also subjected to the polymerization (DE-A 28 21 886 and DE-A 29 48 865). In the case of similar processes as well, the cyclic oligomers, especially the cyclic dimers, are not converted into reactive compounds.

Also known is the strong catalytic action of o-phosphoric acid on the polymerization of $\epsilon$-caprolactam [Geleji, F. et al. "Wirkungsmechanismus verschiedener Katalysatoren bei der Caprolactampolymerisation" [Mechanism of action of various catalysts in the polymerization of caprolactam] in Faserforschung und Textiltechnik 13 (1962) 6, 282–283] in terms of the polymerization of cyclic oligomers (Schade, H. and Beckhaus, F. W.: Verfahren zum Polymerisieren von Oligomeren des $\epsilon$-Caprolactams [Process for polymerizing oligomers of $\epsilon$-caprolactam]—DD Patent 24 307). Disadvantages of such a polymerization technology that occur are, inter alia:

excessively rapid increase in viscosity and hence inadequate reproducibility of the desired degree of polymerization, since the o-phosphoric acid acts essentially as catalyst and to a lesser extent as chain regulator inadequate conversion to $\epsilon$-caprolactam and cyclic oligomers, and depolymerization processes when polyamide 6 granules of this kind are processed.

In order to avoid the abovementioned problems it is common to separate off the oligomers when processing the aqueous extraction waters by distillation. The oligomers separated off are landfilled, which pollutes the environment, or undergo energy-intensive depolymerization into lactam, by processing with phosphoric acid, and the lactam is subsequently passed to a cleaning stage. The residues are land-filled.

For technical reasons concerned with the apparatus and on economic grounds, polyamide manufacturers have to date concentrated the lactam oligomer mixture to a residual water content of $\leq 2\%$ by evaporative concentration. With this water content it becomes impossible to bind the cyclic dimer chemically into the polymer structure.

The aim of the invention is to restrict as much as possible the formation of dimers and oligomers in the preparation of polyamide 6 from fresh lactam and to bind cyclic dimers, especially cyclic dimers introduced by way of recycled lactam, and also cyclic oligomers into the production process and to obtain the processing of the total amount to give high-grade end products while creating a closed circuit of materials (no waste).

SUMMARY OF THE INVENTION

The object on which the invention is based is to hinder the formation of the cyclic dimer in the course of the polymerization and, at the same time, to convert existing cyclic dimers of the lactam-oligomer mixture from recycled lactam into a reactive compound, in a simple manner, and to allow them to participate in the preparation process.

In accordance with the invention, fresh lactam and/or recycled lactam is introduced into a preferably closed system and is treated by hydrolysis in the liquid melt phase under pressure at water contents of from 3% to 15% and at temperatures in the range from 220 to 280° C. A treatment of this kind applied to fresh lactam and/or recycled lactam in a pressure stage is preferably undertaken before these components pass through reaction stages of a polymerization plant.

In the case of the preparation of polyamide 6 from fresh lactam, in a first pressure stage the hydrolysis of the $\epsilon$-caprolactam is undertaken in a closed system having preferably only an entry pipe and an exit pipe, in the liquid melt phase at water contents in the range from 3–10% and at temperatures between 220 and 280° C.

In the case of the preparation of polyamide 6 from fresh lactam or recycled lactam alone, the oligomers are dissolved in the lactam in the reaction mixture, preferably even before entering the first pressure stage. In this case, depending on the initial concentration of the oligomers in the solution, a solution temperature of the oligomers in the lactam of between 120 and 180° C. is established.

In the first pressure stage (dimer treatment stage) the hydrolysis of fresh lactam and recycled lactam, or recycled lactam alone, is undertaken in the liquid melt phase at a temperature in the range from 220 to 280° C. In the course of the hydrolysis of the cyclic oligomers, especially cyclic dimers, in the reaction mixture in this pressure stage, the water content is held, corresponding to the water content of the recycled lactam, at from 6 to 15%.

With the above establishment of water concentration and reaction temperature, the dimeric ring compound is cleaved open. In this case aminocaproic acid and linear dimers are obtained from the cyclic dimer, which allow trouble-free insertion into a polymer chain.

It has surprisingly been found that about 3% of water must be present in the lactam-oligomer mixture in order to cleave the cyclic dimer, with the water component making a favorable and fully effective contribution to the reaction under increased pressure in a closed system. With such a solution it is possible to employ fresh lactam and recycled lactam and also, without problems, even recycled lactam alone.

The water content in the polyamide 6 melt is subsequently set at 0.3 and 1.9% in a further pressure stage with a gas space (polymerization stage) as a function of the desired constant final degree of polymerization by taking off the excess water. To this end the pressure in the gas space of this polymerization stage is regulated, preferably by regulating the water content and/or the temperature.

BRIEF DESCRIPTION OF THE DRAWINGS

The invention will be explained by reference to working examples.

Figure 2:
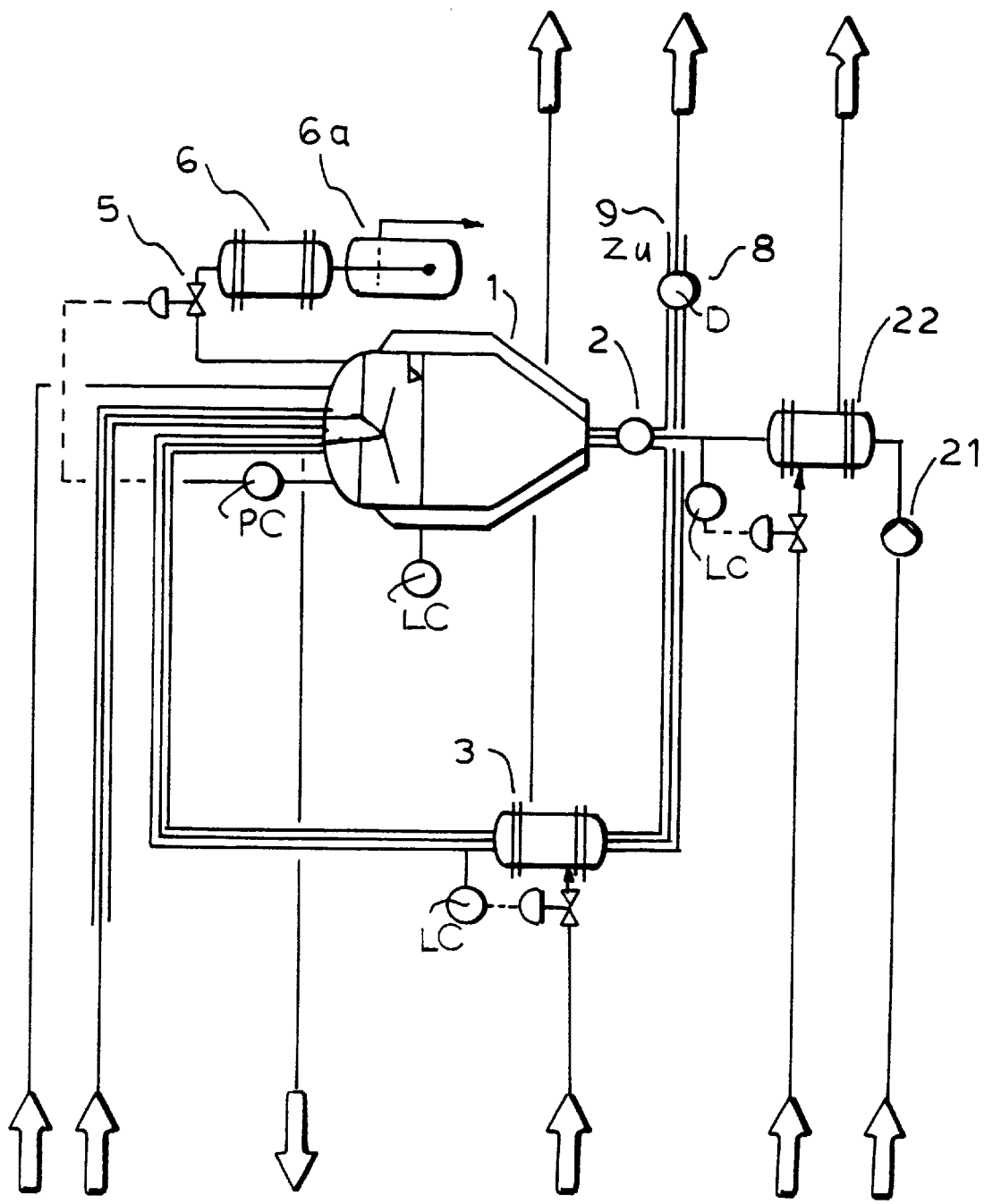

In accordance with the sequence depicted in FIG. 2, undissolved dimers and oligomers present in recycled lactam are dissolved in the lactam.

EXAMPLES

Working example 1

Figure 1:
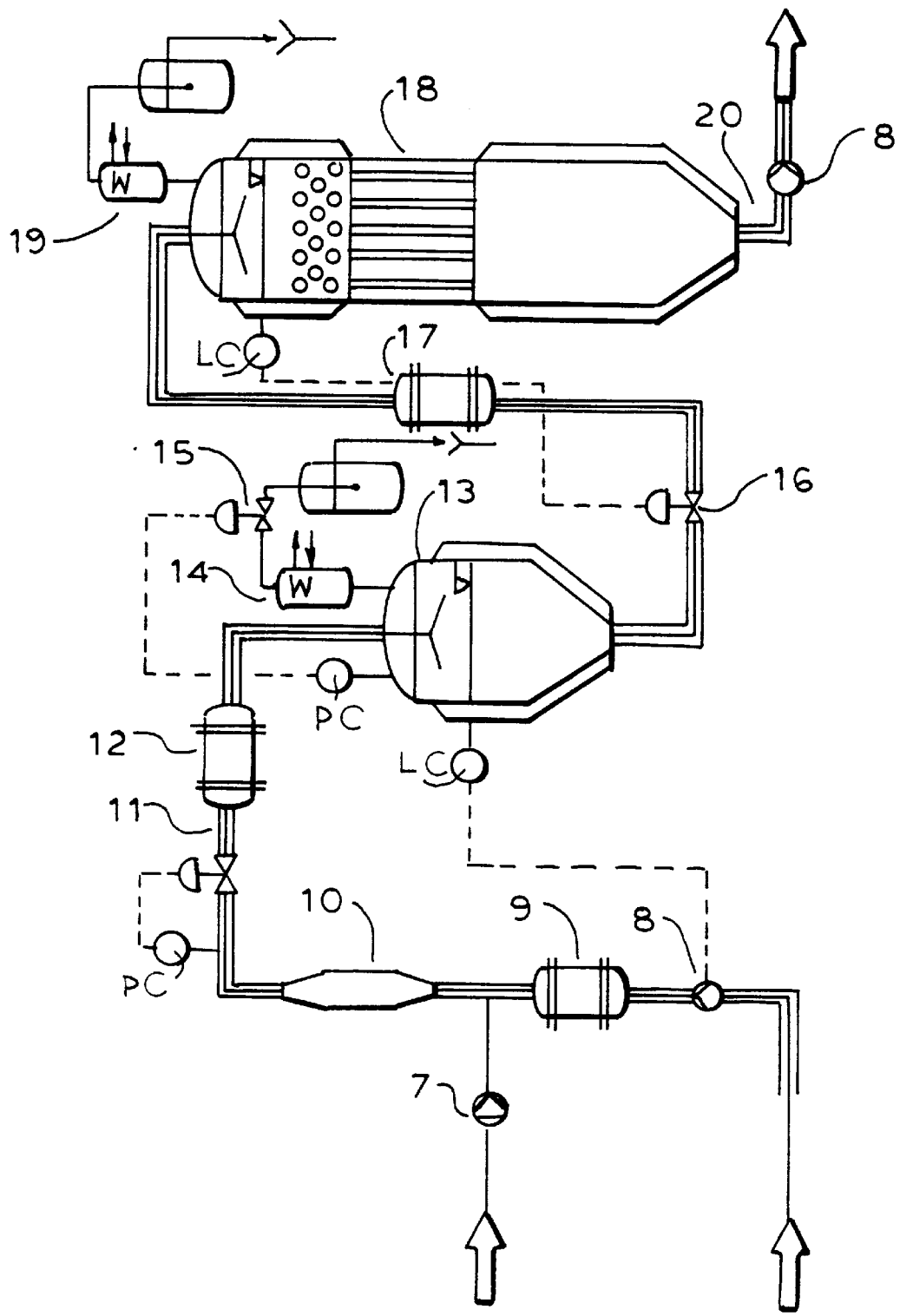
FIG. 1 shows diagrammatically the treatment of the cyclic dimers and the subsequent implementation of the polymerization reaction.

The working example describes a process in which recycled lactam is treated in accordance with FIG. 2 and then in accordance with FIG. 1.

For the preparation of polyamide 6 from recycled lactam, extraction waters are concentrated to a mean solids content of 93% (long-term fluctuation range 91 to 95%). This recycled lactam (so-called return lactam) consists of monomeric lactam, dimers, oligomers and water. When it is passed into the recycled lactam vessel 1, dimers and oligomers are not sufficiently dissolved.

Using the heated pump 2, the recycled lactam is heated to 150° C. by way of the heat exchanger 3. At the mixing temperature which is established in the recycled lactam vessel 1, all dimers and oligomers are dissolved. To establish a water content >3%, in this example between 5 and 9%, the pressure-limited regulating valve 5 is utilized. Any water which evaporates is condensed in the condenser 6 and led off by way of the submersion unit 6a. Water is able to evaporate if the water content in the crude lactam is >9%. By means of the metering pump 8, the recycled lactam is pressed via the heat transfer medium 9 into the dimer treatment stage 10. This and the following sequence is shown in FIG. 1.

In the heat exchanger 9, the recycled lactam is heated to at least 220° C. The dimer treatment stage 10 is a jacketed pressure apparatus which is filled with product—without a gas phase—and is actively insulated via the jacket by means of heat transfer medium.

Under these conditions a polyamide melt is obtained, downstream of the dimer treatment stage 10, having a relative solution viscosity of from 1.25 to 1.35 (solution viscosity based on polymer-sulfuric acid solution with 1 g of polyamide in 100 ml of 96% strength acid in comparison to 96% strength sulfuric acid).

In order to permit the preparation of a polymer with constant and relatively high viscosities, the physically dissolved water that is present in excess must be expelled from the melt in a polymerization stage 13 down to a required water content which is dependent on the desired final viscosity.

The valve 11 ensures that the pressure remains set at above the product boiling point in the dimer treatment stage 10. The product passes by way of the evaporator 12 into the polymerization stage 13, which is operated under pressure at a water concentration of 1.7%. The evaporated water leaves the system by way of the reflux column 14, from where the lactam present in the ascending steam runs back into the polymerization stage 13 again, and the valve 15 regulates the pressure of the process.

After the polymerization stage 13, the polyamide passes by way of valve 16 and evaporator 17 into the polyamide post-condenser 18. In the bottom part of this post-condenser 18 the PA melt is cooled to 240° C.

Via the metering pump 20, the polyamide leaves the process with a solution viscosity of 2.5 and a water-extracted fraction of 9.9%.

Working example 2

In a polymerization unit for the preparation of polyamide 6, a lactam-oligomer mixture is employed which originates from demonomerization stages and hence contains virtually no water.

In order to prevent the oligomers from precipitating, this mixture is heated by means of heat exchanger 3 to 150° C., as a result of which the dimers and oligomers dissolve. This solution can be transported without difficulties over relatively long distances without the pipelines becoming blocked by precipitated oligomers.

The lactam-dimer-oligomer solution is heated, as in Working example 1, in the heat exchanger 9, but this time to a minimum of 240° C., and is subsequently introduced into the pressure stage of the invention, the dimer treatment stage 10, and treated. Between the heat exchanger 9 and the dimer treatment stage 10, water is fed in by way of the valve 7 and the melt is adjusted to a water content of 6% of physically dissolved water. The cyclic oligomers, especially dimers, are reactively cleaved in the pressure stage by hydrolysis.

The subsequent polymerization sequence takes place as described in Working example 1. The resulting polymer has a solution viscosity of 2.52 and a total extract of 9.9%.

Working example 3

In a polymerization plant, polyamide 6 is prepared from recycled lactam and fresh lactam.

To this end an approximately equal amount of fresh lactam is added to the lactam-oligomer mixture recovered from demonomerization stages. At this mixing ratio, the oligomers dissolve in the lactam even at about 120° C. Heating and subsequent treatment of the polymeric melt is performed as described in Working example 1. The supply of water up to a water content of 6% is carried out as set out in Working example 2. The resulting polymer has a solution viscosity of 2.61 and a total extract of 9.7%.

Working example 4

For the preparation of polyamide 6 from fresh lactam, fresh lactam is heated to 240° C. in a heat exchanger 9, as set out in Working example 1 and in FIG. 1, and is then fed to the pressure stage of the invention, the dimer treatment stage 10. Between the heat exchanger 9 and dimer treatment stage 10 the water content of the fresh lactam is set at 3% by adding water. This effectively suppresses the formation of cyclic oligomers and dimers.

The subsequent polymerization sequence takes place as described in Working example 1. The resulting polymer has a solution viscosity of 2.70 and a total extract of 9.6%.

The table below compares the composition of the total extract of the polymers prepared in accordance with the invention in Working examples 1–4, with that of polymers prepared by customary techniques known from the prior art.

plurality of process stages, which comprises supplying recycled lactam to a first and subsequently to a second pressure stage, fresh lactam to the first and subsequently to the second pressure stage or only to the second pressure stage, treatment taking place in the first pressure stage (dimer treatment stage) by hydrolysis in the liquid melt phase at water contents of from 3 to 15% and at temperatures in the range from 220° C. to 280° C., and subsequently supplying the polyamide melt to the subsequent further polymerization process in the second pressure stage, in a pressure stage with a gas space (polymerization stage), while establishing a lower constant water content.

2. The process as claimed in claim 1, wherein recycled lactam and/or fresh lactam are introduced into a closed system.

3. The process as claimed in claim 1, wherein a melt of fresh lactam and/or of recycled lactam is supplied in the presence of water to the first pressure stage (dimer treatment stage) before passing through reaction stages of a polymerization unit.

4. The process as claimed in claim 1, wherein the water content in the dimer treatment stage when only fresh lactam is employed is set in the range from 3–10%.

5. The process as claimed in claim 1, wherein in the melt of fresh lactam and recycled lactam or recycled lactam alone the oligomers are dissolved in the lactam before the polymerization mixture enters the first pressure stage, and the solution temperature of the oligomers in the lactam is set, depending on the concentration of the dimers in the solution, at between 120° C. and 180° C.

6. The process as claimed in claim 1, wherein the water content for the hydrolysis of the cyclic oligomers in the melt of fresh lactam and recycled lactam or recycled lactam alone is held in the first pressure stage, corresponding to the existing water content of the recycled lactam, at from 6 to 15%.

7. The process as claimed in claim 1, wherein the water content in the polymeric melt is set at 0.3–1.9% in the further pressure stage with a gas space (polymerization stage) as a function of the desired final degree of polymerization by taking off the excess water.

| | | | Composition of the total extract in % based on total extract | | | |
|---|---|---|---|---|---|---|
| Reaction product | Process | Total extract (%) | Monomer (%) | Dimer (%) | Trimer (%) | Tetramer (%) |
| Recycled lactam (Working example 1 + 2) | acc. to the invention | 9.9 | 81.8 | 8.3 | 4.8 | 5.1 |
| | acc. to the prior art | 11.2 | 72.1 | 16.3 | 4.9 | 6.7 |
| 50% recycled lactam 50% fresh lactam (Working example 3) | acc. to the invention | 9.7 | 85.5 | 5.1 | 4.5 | 4.9 |
| | acc. to the prior art | 10.5 | 76.9 | 12.1 | 4.5 | 6.5 |
| Fresh lactam (Working example 4) | acc. to the invention | 9.6 | 89.8 | 2.2 | 3.8 | 4.2 |
| | acc. to the prior art | 10.0 | 84.3 | 4.8 | 4.4 | 6.5 |

We claim:

1. A process for continuously preparing polyamide 6 with a low dimer content from ε-caprolactam (fresh lactam) and/or from recycled lactams (so-called return lactams) from extraction stages and melt demonomerization stages, in a 8. The process as claimed in claim 4, wherein the water content in the dimer treatment stage when fresh lactam is employed is set in the range from 3.1–4.5%.

* * * * *